United States Patent
Moreau et al.

[19]

[11] Patent Number: 5,973,500
[45] Date of Patent: Oct. 26, 1999

[54] APPARATUS FOR DETECTING INSULATION DEFECTS IN DEVICES CONNECTED INTO POWER DISTRIBUTION NETWORKS

[75] Inventors: Christophe Moreau, Fontainebleau; Christophe Boisseau, Borron Marlotte; Xavier Charpentier, Saint Mamet, all of France

[73] Assignee: Electricite De France-Service National, Paris, France

[21] Appl. No.: 08/871,675

[22] Filed: Jun. 9, 1997

[30] Foreign Application Priority Data

Jun. 14, 1996 [FR] France .................................. 96 07458

[51] Int. Cl.⁶ .................................................. G01R 31/02
[52] U.S. Cl. .......................... 324/551; 324/509; 324/522; 324/536
[58] Field of Search .................................. 324/509, 510, 324/511, 522, 524, 536, 551; 361/44, 47, 87, 93; 340/650, 651

[56] References Cited

U.S. PATENT DOCUMENTS

| | | | |
|---|---|---|---|
| 4,529,929 | 7/1985 | Berggren | 324/509 |
| 5,446,682 | 8/1995 | Janke et al. | 324/509 X |
| 5,477,150 | 12/1995 | Ham, Jr. et al. | 324/536 |
| 5,789,928 | 8/1998 | Baker | 324/522 X |

FOREIGN PATENT DOCUMENTS

| | | |
|---|---|---|
| 61254 | 9/1982 | European Pat. Off. . |
| 2110827 | 6/1983 | United Kingdom . |
| WO9115890 | 10/1991 | WIPO . |

*Primary Examiner*—Glenn W. Brown
*Attorney, Agent, or Firm*—Sughrue, Mion, Zinn Macpeak & Seas, PLLC

[57] ABSTRACT

An apparatus for detecting an insulation defect in at least one device connected into an electrical power transmission or distribution network and having: leakage current measuring sensors (10) arranged on a ground line (19a, 19b, 19c) of the device; a measurement signal analogue/digital converter (58, 60); and a signal processing unit (14) including a comparison circuit (75) for comparing the measurement signal with a maximum threshold value representative of the maximum value of the leakage current permitted to flow in the ground line (19a, 19b, 19c), to obtain an insulation defect signal. The processing unit (14) includes a discriminator circuit (76) for discriminating, in the insulation defect signal, between a component of a useful signal and a component of a disturbance signal.

14 Claims, 3 Drawing Sheets

APPARATUS FOR DETECTING INSULATION DEFECTS IN DEVICES CONNECTED INTO POWER DISTRIBUTION NETWORKS

BACKGROUND OF THE INVENTION

The present invention relates to an apparatus for detecting an insulation defect in at least one device connected into an electrical power transmission or distribution network and provided with an earthing ground line. It also concerns a detection process implemented within such an apparatus.

The detection apparatuses of this type, known in the state of the art, include means of measuring a leakage current travelling down the said earthing line and liable to contain at least one discharge internal to the said device and engendered in the presence of an insulation defect, these means being arranged on the earthing line of each device, a unit for capture of the measurement signal delivered by the measuring means including means of analogue/digital conversion of the said measurement signal, and a signal processing unit linked to the capture unit and including means of comparing a digital signal resulting from the said conversion with a maximum threshold value representative of the maximum value of the leakage current permitted to flow in the said earthing line, with a view to obtaining, from this comparison, an insulation defect signal.

Such detection apparatuses allow the monitoring of devices by analysis of partial discharges and thus ensure the detection of any aging of the internal insulation of the devices.

These apparatuses are especially adapted to the monitoring of current or voltage transformers of electrical power transmission or distribution networks.

However, the apparatuses of this type have numerous drawbacks, especially by virtue of the fact that they are not capable of effectively distinguishing between the discharges engendered by the network in particular by the corona effect and the discharges engendered in the presence of an insulation defect. They are therefore liable to generate false alarms.

SUMMARY OF THE INVENTION

The purpose of the invention is to alleviate this drawback.

Its subject is therefore an apparatus for detecting an insulation defect of the aforesaid type, characterized in that with the said measurement signals delivered by the measuring means consisting of a useful signal engendered in the presence of an insulation defect internal to the devices and of a disturbance signal, engendered by the said network, the processing unit includes means of discriminating, in the said insulation defect signal, between a component of the useful signal and a component of the disturbance signal.

The invention can furthermore include one or more of the following characteristics:

- the said processing unit furthermore includes means of increasing, in the measurement signal, the signal/noise ratio by spectral subtraction of the said measurement signal and of the said disturbance signal;
- the signal capture unit includes means of sampling the measurement signals at a frequency at least equal to 20 MHz;
- the signal processing unit furthermore includes a finite impulse response digital filter for eliminating the low-frequency component of the digital signal resulting from the conversion of the said measurement signal, with linear phase-shift;
- the means of discriminating between the said component of the useful signal and the said component of the disturbance signal include, stored in the said signal processing unit, an algorithm for discriminating between the said components by analysis of an electromagnetic coupling factor between the phases of the transmission or distribution network;
- the means of discriminating between the said component of the useful signal and the said component of the disturbance signal include, stored in the said processing unit, an algorithm for discriminating between the said components by elimination, from the said insulation defect signal, of at least one region corresponding to a voltage peak of the transmission or distribution network;
- the means of discriminating between the said component of the useful signal and the said component of the disturbance signal include, stored in the processing unit, an algorithm for discriminating between the said components by analysis of the difference between the sign of the slope of the insulation defect signal and the polarity of the voltage of the transmission or distribution network.

The subject of the invention is also a process for detecting an insulation defect implemented within the detection apparatus defined above, in which the leakage current travelling down the earthing ground line and liable to contain at least one discharge internal to the said device and engendered in the presence of an insulation defect is measured, the analogue signal measuring the is leakage current is converted into a digital measurement signal, the digital measurement signal is compared with a threshold value representative of the maximum value of the leakage current permitted to flow in the said earthing line and an insulation defect signal is engendered when the digital measurement signal is greater than the said threshold value, characterized in that with the measurement signal consisting of a useful signal engendered in the presence of an insulation defect internal to the device and of a disturbance signal, engendered by the said network, it furthermore includes a step of discrimination of the insulation defect signal between a component of the useful signal and a component of the disturbance signal, subsequent to the step consisting in engendering the insulation defect signal.

Other characteristics and advantages will emerge from the following description given merely by way of example and with reference to the appended drawings in which:

DESCRIPTION OF THE PREFERRED EMBODIMENT

Figure 1:
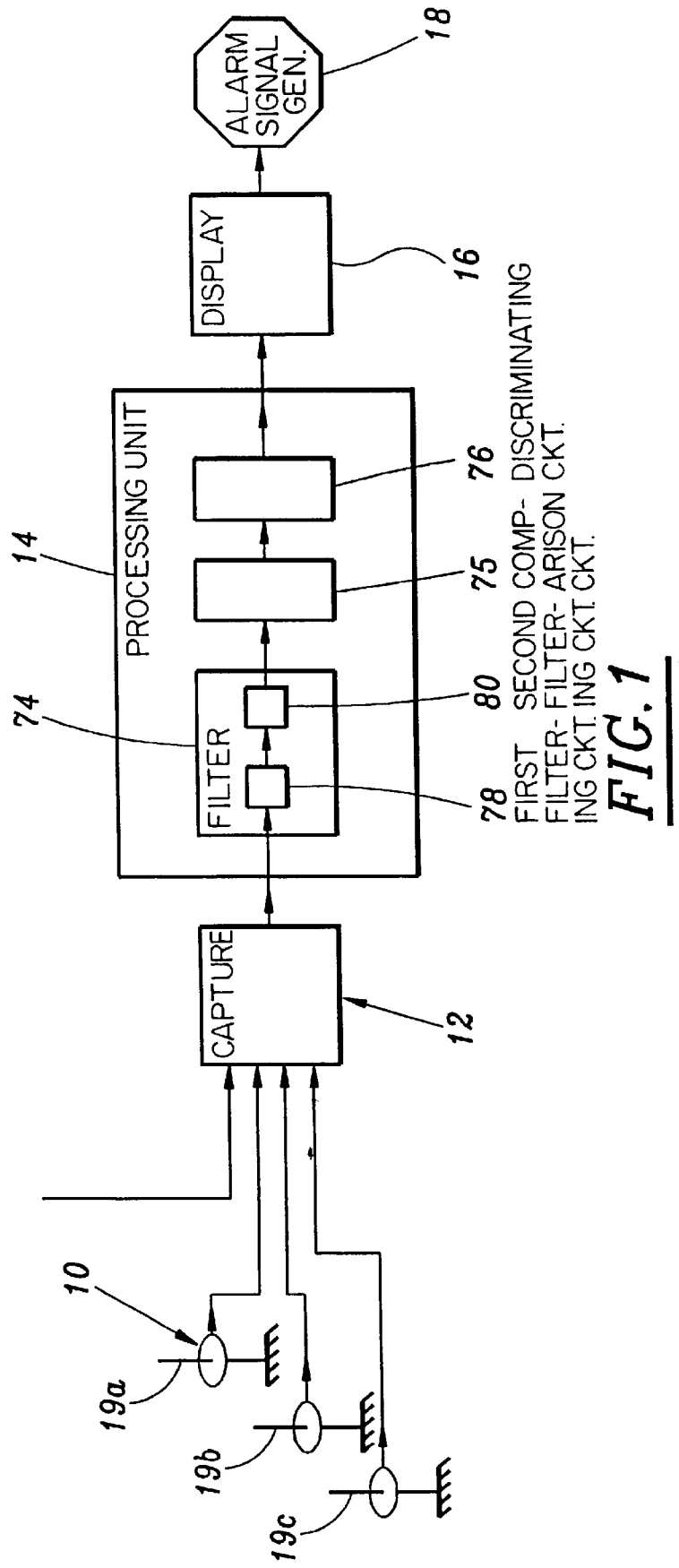
FIG. 1 is a schematic diagram of the detection apparatus according to the invention.

Represented in FIG. 1 is a schematic diagram of an apparatus for detecting an insulation defect according to the invention.

This apparatus is intended to ensure the detection of insulation defects occurring in voltage or current transformers with which an electrical power transmission or distribution network, not represented in this FIG. 1, is equipped.

The description of the invention which follows is applied to the detection of insulation defects appearing in such transformers, but of course the invention applies equally to the detection of insulation defects occurring in other types of electrical devices connected into the network and provided with an earthing ground line.

The apparatus includes means 10 for measuring the leakage current engendered in the presence of an insulation defect, a reception/capture unit 12 for the measurement signal delivered by the measuring means 10 and a processing unit 14 linked to the capture unit 12 and ensuring the detection of the discharges internal to the transformers so as to monitor the insulation thereof.

The processing unit 14 is linked to a facility 16 for displaying the insulation defects detected and to a generator of alarm signals 18, both of known type.

The means 10 for measuring the leakage current consist of high-frequency current sensors, for example current transformers installed in the earthing line, 19a, 19b and 19c respectively, of the transformers to be monitored.

In FIG. 1 the transformers have not been represented, only their earthing line 19a, 19b and 19c having been diagrammatically represented.

Three transformers may be seen to be monitored simultaneously in this FIG. 1.

The sensors used have a passband preferably lying between 400 kHz and 90 Mhz. They have a structure of known type. They will therefore not be described in detail below. It will be noted, however, that these sensors are adapted for the envisaged use, and are therefore capable of being installed on the earthing line of each transformer without modification of this line.

They deliver to the capture unit 12 a signal measuring the leakage current travelling down the earthing line and liable to contain one or more partial discharges internal to the transformer, engendered by an internal insulation defect therein.

The capture unit 12 receives, as input, the high-frequency measurement current originating from the sensors, at a frequency for example of the order of from a few tens of kHz to a few MHz and over a complete period of 50 Hz. This unit 12 ensures A/D conversion of the high-frequency currents to create digital samples, for example numbering 400,000 points per sensor and per period of 50 Hz.

Simultaneously with the capture of the measurement signal delivered by the three sensors 10, the capture unit 12 receives as input a signal V measuring the instantaneous voltage of the network, the value of this voltage V serving as reference for the processing unit 14 to discriminate between the internal discharges engendered in the presence of the insulation defect and the nuisance external discharges engendered in particular by the corona effect.

This measurement signal V is supplied by a conventional measuring facility.

The description of the capture unit 12 will now be made with reference to FIG. 2.

Figure 2:
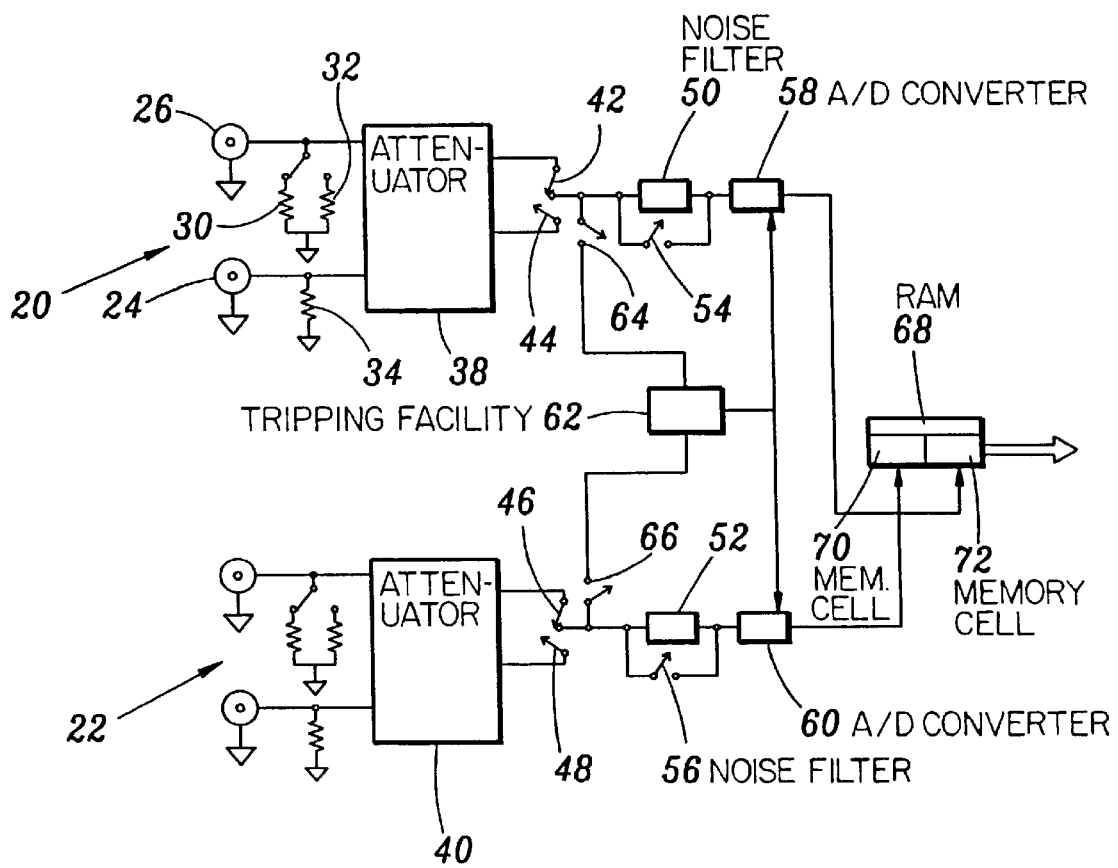
FIG. 2 is a schematic diagram of the capture unit.

The capture unit 12 includes two identical stages each having the structure represented in FIG. 2.

The circuit represented in this figure includes two input channels, respectively 20 and 22, for capturing the measurement signal delivered by the measuring sensors 10 and the signal V measuring the voltage of the network.

The two input channels 20 and 22 of one of the cards are linked to two measurement sensors 10, whilst one of the input channels of the second card is linked to the third measurement sensor, the second input being linked to the facility for measuring the voltage of the network.

Each input channel 20 and 22 includes two input terminals, such as 24 and 26, the one, for example 24, connected up to the facility for measuring the voltage of the network, the other, 26, connected to a corresponding measurement sensor 10.

When one of the input channels 20 and 22 is linked to a leakage current measurement sensor 10, the corresponding input terminal 24, intended to receive the signal V, is not connected up.

When this input channel 20 is linked to the facility for measuring the voltage V of the network, the other corresponding terminal 26, intended to receive the leakage current measurement signal, is not connected up.

The input terminals 24, 26 are connected up, by way of input resistors 30, 32 and 34, to an attenuator circuit, 38 and 40, of conventional type.

The output of each attenuator circuit 38 and 40 is linked, by way of two switches, respectively 42, 44 and 46, 48, to a noise filtering circuit 50 and 52, with cut-off frequency close to 10 MHz.

The switches 42, 44 and 46, 48 ensure selection of the signal capture mode, namely selection between a mode of capture of the signal V measuring the instantaneous voltage of the network and a mode of capture of the measurement signal delivered by the sensors 10.

It should be noted that the filtering circuits 50 and 52 can be short-circuited by corresponding switches 54 and 56.

Each output of the filtering circuits 50 and 52 is linked to an analogue/digital converter, 58 and 60 respectively, each ensuring conversion of the measurement signals into a corresponding digital signal.

This circuit is complemented with a tripping facility 62 linked on the one hand, by way of two corresponding switches 64 and 66, to the input of the filtering circuits 50 and 52 and, on the other hand, to the converters 58 and 60.

The tripping facility 62 triggers the conversion of the measurement signals, carried out in the analogue/digital converter circuits 58 and 60, when the instantaneous value of the voltage of the network is equal to a particular and predefined value, for example 0 V. This conversion is performed at a frequency equal to at least 20 MHz which allows, under the control of the tripping facility 62, the sampling of the measurement signals with a large number of points, at least equal to 400,000, this number of sampling points making it possible to obtain a sampled signal which faithfully reproduces the incoming measurement signal, thus allowing analysis in the processing unit 14 which is very effective.

The sampled signal is then stored in a RAM memory 68, consisting of an assembly of two memory cells 70 and 72, each of capacity equal for example to 512 Kb, and linked to the processing unit 14 (FIG. 1).

Thus, the sampled signal made up of a set of blocks of 400,000 points and stored in the RAM memory 68 is delivered to the processing unit 14.

Referring again to FIG. 1, the processing unit 14 includes a filtering circuit 74 linked to the capture unit 12 receiving the sampled signal extracted from the RAM memory 68, a circuit 75 for comparing the sampled signal filtered by the filtering circuit 74 with a threshold value representative of the maximum value of the leakage current permitted to flow in the earthing lines 19a, 19b and 19c and a discriminating circuit 76 placed at the output of the comparing circuit 75.

The filtering circuit 74 includes a first filtering circuit 78 for eliminating the low-frequency component of the sampled measurement signal and a second filtering circuit 80 for increasing the signal/noise ratio in the sampled measurement signal.

The first filtering circuit 78 consists of a linear phase-shift finite impulse response digital filter, of conventional type. It is embodied on the basis of an algorithm stored in a computer and makes it possible to eliminate the DC component of the measurement signal without modification of the phase of the measurement signal.

The second filtering circuit 80 also consists of a filter embodied in software form. It includes an algorithm for spectral subtraction of the noise present in the sampled measurement signal.

Figure 3:
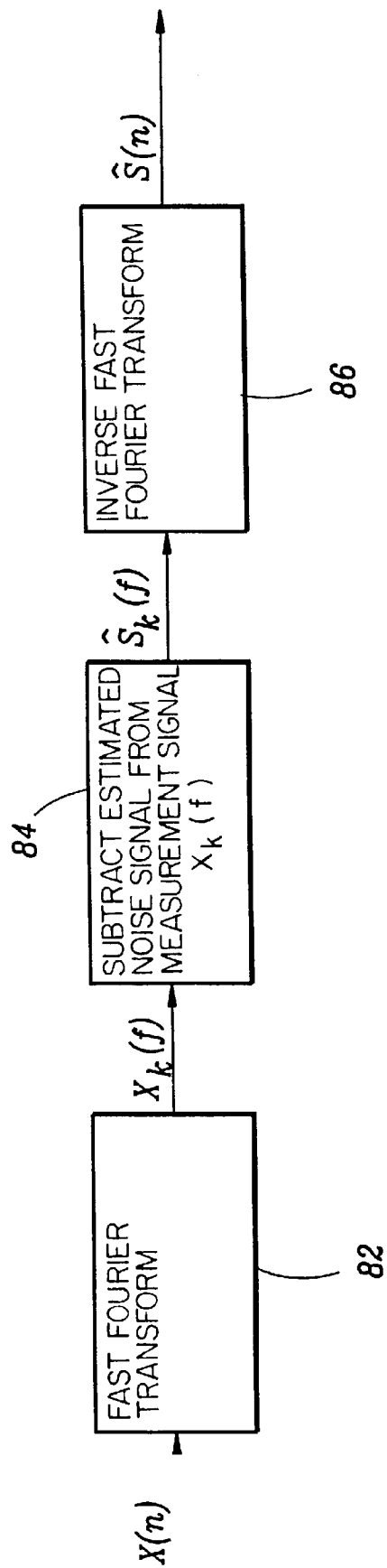
FIG. 3 is a schematic diagram of a part of the processing unit ensuring the increasing of the signal/noise ratio.

Referring to FIG. 3, it is seen that the algorithm for spectral subtraction of the noise includes a first phase 82 carrying out a fast Fourier transform of the sampled measurement signal X(n) for converting this signal into a frequency signal $X_k(f)$. This signal $X_k(f)$ satisfies the following relation:

$$X_k(f) = S_k(f) + B_k(f),$$

in which, k is the index of a sampling sub-block of size 256 points, each sub-block having an overlap factor between sub-blocks of around ½.

$S_k(f)$ is a useful frequency signal engendered by discharges internal to the transformer, and $B_k(f)$ is a noise signal corresponding to a disturbance frequency signal $S_k(f)$ engendered by external discharges triggered in particular by the corona effect.

In the next phase 84 the noise signal $\hat{B}_k(f)$ is estimated according to the following relation:

$$|\hat{B}_k(f)| = \frac{1-\lambda}{1-\lambda^k} \sum_{p=1}^{k} \lambda^{k-p} |X_p(f)| \qquad (2)$$

for k>0 and, $$|\hat{B}(f)| = 0$$

for k=0, in which λ is the disregard factor, lying between 0 and 1.

The estimated noise signal $\hat{B}_k(f)$ is subtracted, in this phase 84, from the measurement signal $X_k(f)$ according to the following relation:

$$\hat{S}_k(f) = X_k(f) - \hat{B}_k(f) \qquad (3)$$

in which $\hat{S}_k(f)$ denotes the spectral signal resulting from the spectral subtraction.

The signal $\hat{S}_k(f)$ then undergoes, in the next phase 86, an inverse fast Fourier transform so as to deliver to the comparison circuit 75 a signal $\hat{S}(n)$ which has undergone a gain in signal/noise ratio of around 6 dB.

The comparison circuit 75 calculates, as described previously, the difference between the signal and a threshold value representative of the maximum value of the leakage current permitted to flow in the earthing ground lines 19a, 19b and 19c of the transformers.

The threshold used is preferably calculated from the standard deviation of the sampled signal. It is for example equal to ten times this standard deviation.

This comparison circuit 75 thus delivers to the discriminating circuit 76 a signal representing the current of a transformer one or more insulation defect signals including a useful component engendered by the internal discharges and a component disturbing the useful component engendered by the external discharges.

The discriminating circuit 76 ensures discrimination between these components so as to eliminate, from the insulation defect detection signal, the component engendered by the external discharges.

The discriminating circuit 76 consists of a computer in which three discrimination algorithms are stored, applied in succession and in any order to the insulation defect signal.

The first discrimination algorithm discriminates between the components of the insulation defect signal on the basis of the analysis of the electromagnetic coupling factor between the phases of the network.

Thus, it is known that, within the transmission delay, a discharge detected on one of the phases engenders a discharge on the other phases.

Furthermore, experimental results show that the coupling between the phases depends on the nature of the discharge and on the geometrical configuration of the network. These experimental results show that the coupling factor, namely the attenuation factor, corresponding to an external discharge, is less than the coupling factor corresponding to an internal discharge.

Whereupon, the first discrimination algorithm performs a calculation of the coupling factor between the phases and compares this coupling factor with corresponding experimental values with a view to discriminating between the component of the useful signal which is engendered in the presence of an insulation defect and the disturbing component engendered in particular by the corona effect.

Thus, the disturbance signal component is eliminated.

The second discrimination algorithm examines the sign of the slope of the reference voltage and the polarity of the said insulation defect signal.

Thus, if the polarity of a discharge has the same sign as the slope of the reference voltage, for the same phase, this discharge is an internal discharge. In the contrary case, this discharge is an external discharge.

The second discrimination algorithm uses this principle and carries out a comparison between the polarity of the insulation defect signal and the slope of the reference voltage V. It thus eliminates the component of the insulation defect signal whose polarity is different from the sign of the slope of the reference voltage.

Finally, the third discrimination algorithm carries out a windowing filtering of the insulation defect signal. Thus, experiments show that the activity of the corona effect is located in the neighborhood of the peaks in the instantaneous voltage V supplied by the electrical power transmission or distribution network.

Thus, according to this discrimination algorithm, the reference voltage V is continuously monitored and the sampling points located in the neighborhood of the voltage peaks are eliminated.

It should be noted that the width of the elimination band is parametrized as a function of the voltage level of the apparatus to be monitored.

It is appreciated that the apparatus for detecting an insulation defect which has just been described makes it possible to monitor the aging of voltage or current transformers connected into an electrical power transmission or distribution network, without modification of the earthing line of these transformers.

It furthermore makes it possible to eliminate the false alarms engendered in particular by the corona effect, this making it possible to optimize the intervention of the maintenance teams.

What is claimed is:

1. An apparatus for detecting an insulation defect in at least one device connected into an electrical power transmission or distribution network and provided with a ground line (19a, 19b, 19c), comprising:

measuring means (10) for measuring a leakage current travelling down said ground line (19a, 19b, 19c) and containing at least one discharge internal to the at least one device, said discharge being engendered in the presence of an insulation defect, said measuring means being arranged on said ground line (19a, 19b, 19c);

a capture unit (12), for capture of a measurement signal delivered by the measuring means (10), including means (58, 60) of analogue/digital conversion of the measurement signal; and a signal processing unit (14) linked to the capture unit (12) and including comparison means (75) for comparing a digital signal, resulting from the conversion, with a maximum threshold value representative of the maximum value of the leakage current permitted to flow in said ground line, to obtain, from this comparison, an insulation defect signal; wherein said measurement signal delivered by the measuring means consists of a useful signal ($S_k(f)$), engendered in the presence of an insulation defect internal to said at least one device, and of a disturbance signal ($B_k(f)$) engendered by the network, and the processing unit (14) includes means for discriminating (76), in the insulation defect signal, between a component of the useful signal ($S_k(f)$) and a component of the disturbance signal ($B_k(f)$).

2. The apparatus according to claim 1, characterized in that said processing unit (14) furthermore includes means (80) for increasing the signal/noise ratio by spectral subtraction of the digitized measurement signal and of the digitized disturbance signal ($B_k(f)$), said comparison means being connected to an output of said means for increasing the signal/noise ratio.

3. Apparatus according to claim 1, characterized in that the capture unit (12) includes means (58, 60) of sampling the measurement signal at a frequency at least equal to 20 MHz.

4. Apparatus according to claim 1, characterized in that the processing unit (14) furthermore includes a finite impulse response digital filter (78) for eliminating the low-frequency component of the digital signal resulting from the conversion of the measurement signal.

5. Apparatus according to claim 4, characterized in that said finite impulse response digital filter (78) is a linear phase-shift digital filter.

6. Apparatus according to claim 1, characterized in that the means (76) for discriminating between the component of the useful signal ($S_k(f)$) and the component of the disturbance signal ($B_k(f)$) includes, stored in said processing unit (14), an algorithm for discriminating between the components by analysis of an electromagnetic coupling factor between the phases of the transmission or distribution network.

7. Apparatus according to claim 1, characterized in that the means (76) for discriminating between the component of the useful signal ($S_k(f)$) and the component of the disturbance signal ($B_k(f)$) includes, stored in said processing unit (14), an algorithm for discriminating between the components by elimination, from the insulation defect signal, of at least one region corresponding to a voltage peak (V) of the transmission or distribution network.

8. Apparatus according to claim 1, characterized in that the means (76) for discriminating between the component of the useful signal and the component of the disturbance signal includes, stored in the processing unit (14), an algorithm for discriminating between the components by analysis of the difference between the polarity of the insulation defect signal and the sign of the slope of the voltage (V) of the transmission or distribution network.

9. A process for detecting an insulation defect in at least one device connected into an electrical power transmission or distribution network and provided with a ground line (19a, 19b, 19c), comprising the steps of:

measuring a leakage current travelling down the ground line (19a, 19b, 19c) and containing at least one discharge that is internal to the at least one device and that is engendered in the presence of an insulation defect;

converting the analogue signal measuring the leakage current into a digital measurement signal;

comparing the digital measurement signal with a threshold value representative of the maximum value of the leakage current permitted to flow in the ground line (19a, 19b, 19c); and engendering an insulation defect signal when the digital measurement signal is greater than the threshold value; wherein, with the measurement signal consisting of a useful signal ($S_k(f)$), engendered in the presence of an insulation defect internal to the at least one device, and of a disturbance signal ($B_k(f)$), engendered by the network, said process further includes a step of discriminating in the insulation defect signal, between a component of the useful signal ($S_k(f)$) and a component of the disturbance signal ($B_k(f)$), subsequent to the step of engendering the insulation defect signal.

10. The process according to claim 9, further comprising the step of increasing, in the measurement signal, the signal/noise ratio by spectral subtraction of the digitized measurement signal and the digitized disturbance signal ($B_k(f)$), prior to said comparing step.

11. Process according to claim 9, characterized in that it furthermore includes a step of eliminating the low-frequency component of the measurement signal by means of a finite impulse response and linear phase-shift digital filter (78), subsequent to said converting step.

12. Process according to claim 9, characterized in that said discrimination step consists in discriminating said components by analysis of an electromagnetic coupling factor between the phases of the transmission or distribution network.

13. The process according to claim 9, characterized in that said discriminating step comprises eliminating from the insulation defect signal, at least one region corresponding to a voltage peak (V) of the transmission or distribution network.

14. The process according to claim 9, characterized in that said discriminating step comprises discriminating the components by analysis of the difference between the polarity of the insulation defect signal and the sign of the slope of the voltage (V) of the transmission or distribution network.

* * * * *